US012653746B2

(12) United States Patent
Wilber et al.

(10) Patent No.: US 12,653,746 B2
(45) Date of Patent: Jun. 16, 2026

(54) ROBUST FUNERAL CONTAINER LID

(71) Applicant: Vandor Group, Inc., Richmond, IN (US)

(72) Inventors: Brent Wilber, Richmond, IN (US); Justin Davis, Richmond, IN (US); Trevor Mace, Terre Haute, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/658,366

(22) Filed: May 8, 2024

(65) Prior Publication Data

US 2024/0374452 A1 Nov. 14, 2024

Related U.S. Application Data

(60) Provisional application No. 63/500,820, filed on May 8, 2023.

(51) Int. Cl.
*A61G 17/02* (2006.01)
*A61G 17/007* (2006.01)
*A61G 17/00* (2006.01)

(52) U.S. Cl.
CPC ....... *A61G 17/034* (2017.05); *A61G 17/0073* (2013.01); *A61G 17/0106* (2017.05); *A61G 17/004* (2016.11)

(58) Field of Classification Search
CPC .............. A61G 17/034; A61G 17/0106; A61G 17/0073; A61G 17/004; B65D 5/446; B65D 5/64; B65D 43/00; B65D 43/02
See application file for complete search history.

(56) References Cited

U.S. PATENT DOCUMENTS 4,123,831 A * 11/1978 Covington ........... A61G 17/044 27/4
4,730,370 A * 3/1988 Elder ................................ 27/14
4,773,134 A * 9/1988 Kay ................... A61G 17/0073 27/14
4,944,076 A * 7/1990 Kay ..................... A61G 17/028 27/14
4,967,455 A * 11/1990 Elder ................. A61G 17/0073 27/14

(Continued)

FOREIGN PATENT DOCUMENTS

CN 2379120 Y * 5/2000
CN 101129287 A * 2/2008
WO WO-2010148465 A1 * 12/2010 ............. A61G 17/00

*Primary Examiner* — William L Miller
(74) *Attorney, Agent, or Firm* — Maginot, Moore & Beck LLP

(57) ABSTRACT

A lid for a casket includes a folded corrugated structure, a top plank, and side planks. The folded corrugated structure has a top panel having a length and width, a first side panel foldably attached to the top panel along a first long edge, a second side panel foldably attached to the top panel along a second long edge. The top plank is affixed to the top panel and extends a majority of the length and width of the top panel. One side plank is affixed to the first side panel, and extends a majority of a length of the first side panel. Another side plank is affixed to the second side panel, and extends a majority of a length of the second side panel. The top plank and the side planks are formed of one or more solid materials having a rigidity greater than that of the corrugated structure.

20 Claims, 10 Drawing Sheets

(56) References Cited

U.S. PATENT DOCUMENTS

| | | | | | |
|---|---|---|---|---|---|
| 5,454,141 | A * | 10/1995 | Ozbun | A61G 17/0073 27/19 |
| 6,105,220 | A * | 8/2000 | Belanger | A61G 17/0073 27/19 |
| 6,131,253 | A * | 10/2000 | Jenkins | A61G 17/004 27/14 |
| 6,145,175 | A * | 11/2000 | Enneking | B65D 5/68 27/19 |
| 7,337,484 | B2 * | 3/2008 | Cox | A61G 1/01 128/870 |
| 8,375,535 | B2 * | 2/2013 | Cox | A61G 17/004 220/666 |
| 9,649,241 | B2 * | 5/2017 | Cox | A61G 17/034 |
| 11,141,338 | B2 * | 10/2021 | Davis | A61G 17/042 |
| 11,154,448 | B2 * | 10/2021 | Davis | A61G 17/001 |
| 11,311,443 | B2 * | 4/2022 | Davis | A61G 17/0073 |
| 12,268,639 | B2 * | 4/2025 | Davis | A61G 17/042 |
| 2011/0000059 | A1 * | 1/2011 | Davis | A61G 17/06 27/14 |
| 2014/0026378 | A1 * | 1/2014 | Gessel | A61G 17/0073 27/14 |
| 2014/0123450 | A1 * | 5/2014 | Jenson | A61G 17/004 27/14 |
| 2016/0354270 | A1 * | 12/2016 | Cox | A61G 17/0106 |
| 2016/0367424 | A1 * | 12/2016 | Krinsky | A61G 17/0073 |
| 2017/0281448 | A1 * | 10/2017 | Davis | A61G 17/047 |
| 2020/0146920 | A1 * | 5/2020 | Davis | A61G 17/042 |
| 2023/0390138 | A1 * | 12/2023 | Davis | A61G 17/007 |
| 2024/0108527 | A1 * | 4/2024 | Davis | A61G 17/004 |

* cited by examiner

ROBUST FUNERAL CONTAINER LID

This application claims the benefit of U.S. Provisional Patent Application Ser. No. 63/500,820, filed May 8, 2023, which is incorporated herein by reference in its entirety.

FIELD OF THE INVENTION

The present invention generally relates to funereal products, particularly funerary container lids.

BACKGROUND

Funerary containers include full size casket containers and lower profile funerary trays. Funerary trays are tray-like containers that have a length and width similar to a standard casket but with a reduced height. Funerary trays can be used as inserts to a ceremonial rental casket or bed viewer, as a mechanism for transporting a body by air, and/or as body carriers for cremation or burial. To save costs, funerary trays are often made of low-cost wood products, or even completely of corrugated fiberboard, which is sometimes commonly known as corrugated cardboard.

Corrugated fiberboard funerary trays, such as those disclosed in U.S. Pat. Nos. 7,337,484 and/or 8,375,535, have the advantage of extremely low cost. Thus, corrugated fiberboard funerary trays enjoy significant use in ceremonial rental caskets, bed viewers and for basic containers used in the cremation market. In a common practice, the deceased is displayed in an ornate ceremonial rental casket while disposed on the funerary tray. After the viewing and any services, the funerary tray, the deceased, and any accompanying fabric in physical contact with the deceased are removed from the ceremonial rental casket and transported to the crematory or place of interment.

During such transport, and/or during interment, it is normal practice to place a lid over the funerary tray and the deceased. Because the tray has a low profile, the lid must often have depth (in the height direction) to adequately fit over the body. The Safeway® brand cremation container available from Vandor Group, Inc. of Richmond, IN, is an example of a low profile corrugated fiberboard funerary tray with a higher profile corrugated fiberboard lid.

In some cases, however, it is desirable or preferable to provide such a lid with increased strength over than of corrugated fiberboard. For example, in some cases, cremation and/or burial containers can be stacked. Corrugated fiberboard, particularly if made lightweight, may have a risk of deformation or partial failure when subjected to heavy loads on top of the lid. Moreover, some consumers and/or funeral professionals prefer the tactile and structural integrity of wood over corrugated fiberboard. However, caskets and casket lids made entirely of wood (and with exposed wood) can be quite a bit more expensive in materials and have a higher cost of manufacture than those formed of corrugated fiberboard.

It would be desirable, therefore, to provide funerary tray lid that enjoys the perceived and real strength advantages of wood-based lids, without the full material cost of a traditional wooden casket lid.

SUMMARY

At least some embodiment disclosed herein addresses the above need by providing a funerary tray lid having wood or other rigid fiber based structural elements that are wrapped in corrugated fiberboard. Such a lid would not require all of the wood necessary to form a complete lid, but would still provide the structural advantages of wood.

The advantages are provided in some embodiments by use of a foldable corrugated fiberboard-based skin with wood (or other rigid material) planks that form the top and two of the sides of the lid attached to the folded corrugated fiberboard. This reduces weight and cost over a full wood casket lid. It will be appreciated that these advantages may be obtained even if the lid is a shallow lid used in connection with a full-height funeral tray or box.

In a first embodiment, a lid for a casket includes a folded corrugated structure, a top plank, and side planks. The folded corrugated structure has a top panel having a length and width, a first side panel foldably attached to the top panel along a first long edge, a second side panel foldably attached to the top panel along a second long edge. The top plank is affixed to the top panel and extends a majority of the length and width of the top panel. One side plank is affixed to the first side panel, and extends a majority of a length of the first side panel. Another side plank is affixed to the second side panel, and extends a majority of a length of the second side panel. The top plank and the side planks are formed of one or more solid materials having a rigidity greater than that of the corrugated structure.

The above-described features and advantages, as well as others, will become more readily apparent to those of ordinary skill in the art by reference to the following detailed description and accompanying drawings.

DETAILED DESCRIPTION

Figure 1:
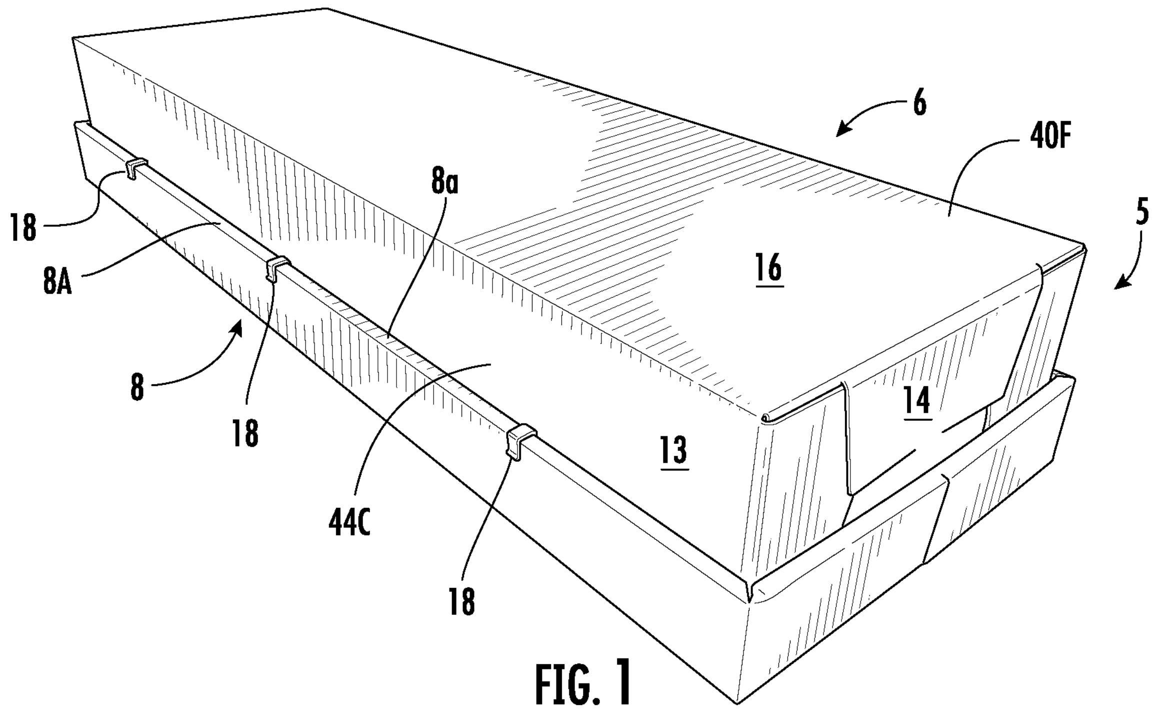
FIG. 1 shows a perspective view of a funerary tray lid disposed on a funeral tray according to a first embodiment.

FIG. 1 shows a perspective view of a casket assembly 5 having a funerary tray 8 and a funeral tray lid 10 according to a first embodiment disposed thereon. The casket assembly 5 of FIG. 1 appears as used with deceased, not shown, within the closed casket assembly 5. The tray 8 may be any suitable low-profile funerary tray configured in length and wide to receive a deceased human adult. By way of non-limiting example, the tray 8 may be the funerary tray of the Safeway® cremation container, or of the Safewood™ cremation container, both available from Vandor Group, Inc. In other embodiments, the funerary tray lid 10 may be used with full height casket containers as well.

Figure 2:
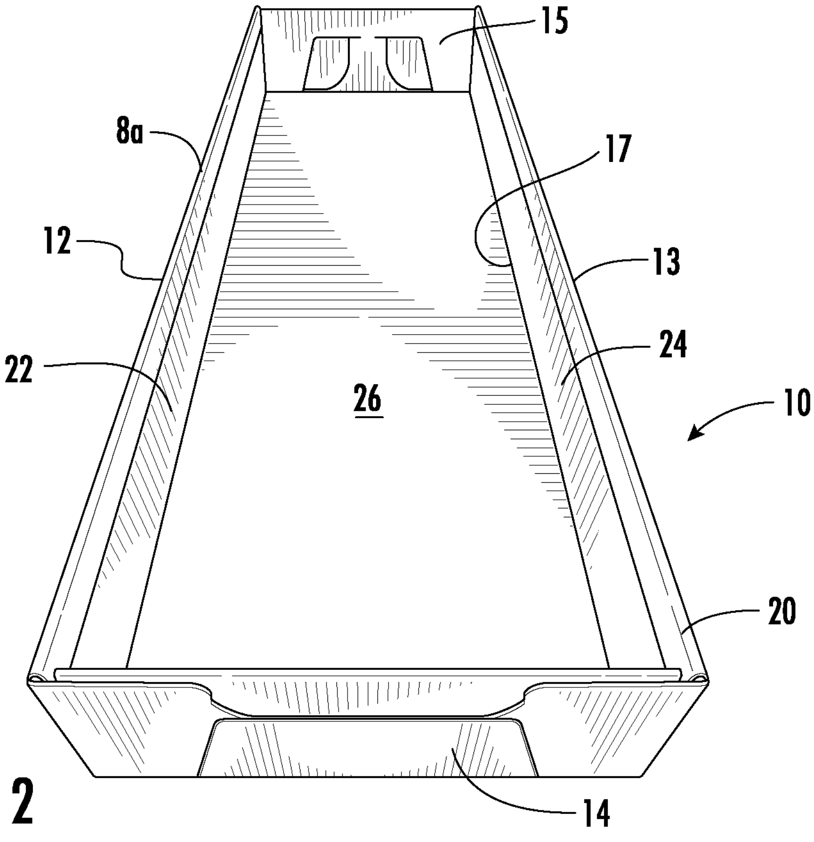
FIG. 2 shows a bottom perspective view of the funerary tray lid of FIG. 1.
Figure 3:
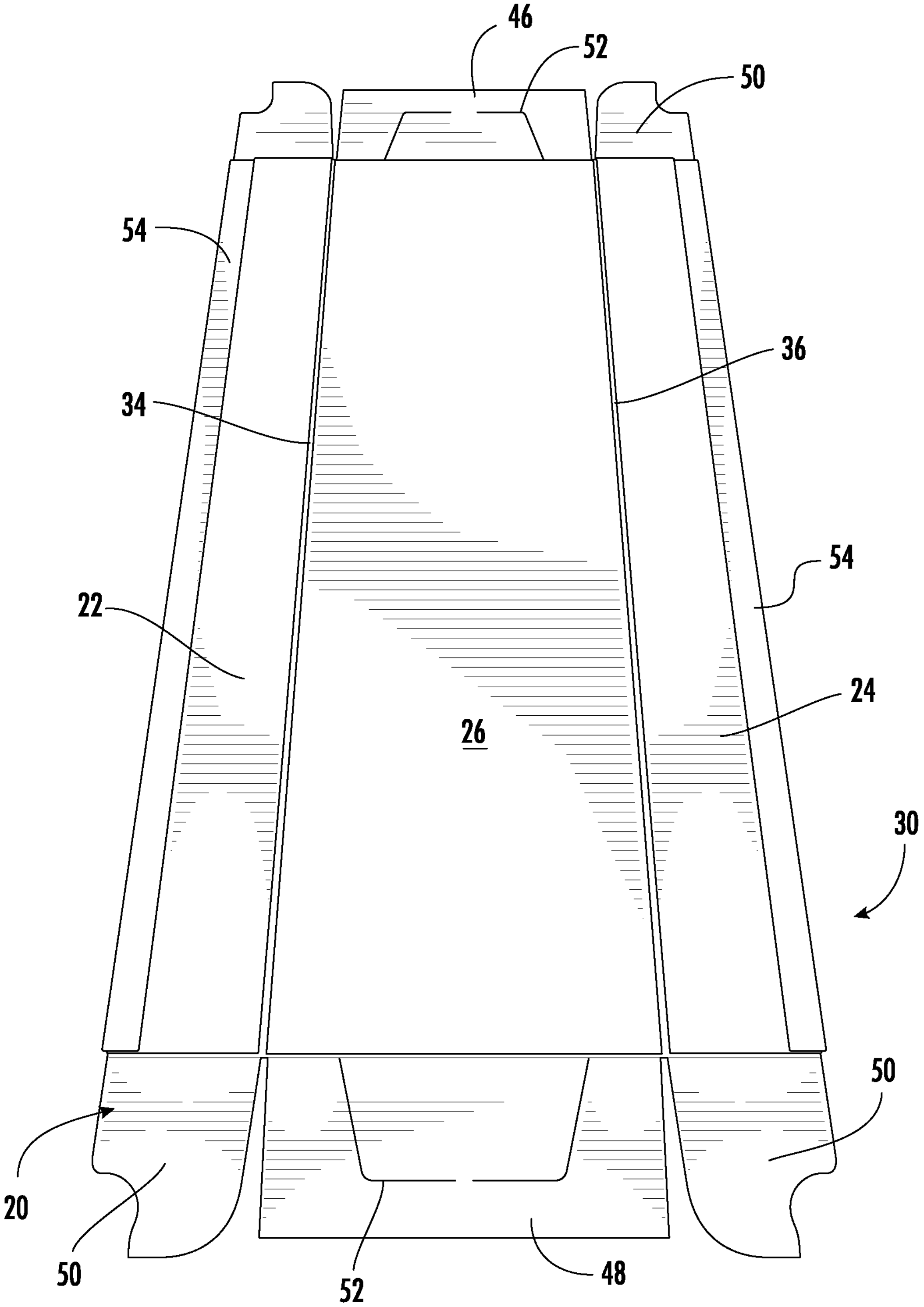
FIG. 3 shows a perspective view of the funerary tray lid of FIG. 2 in an unfolded states.
Figure 4:
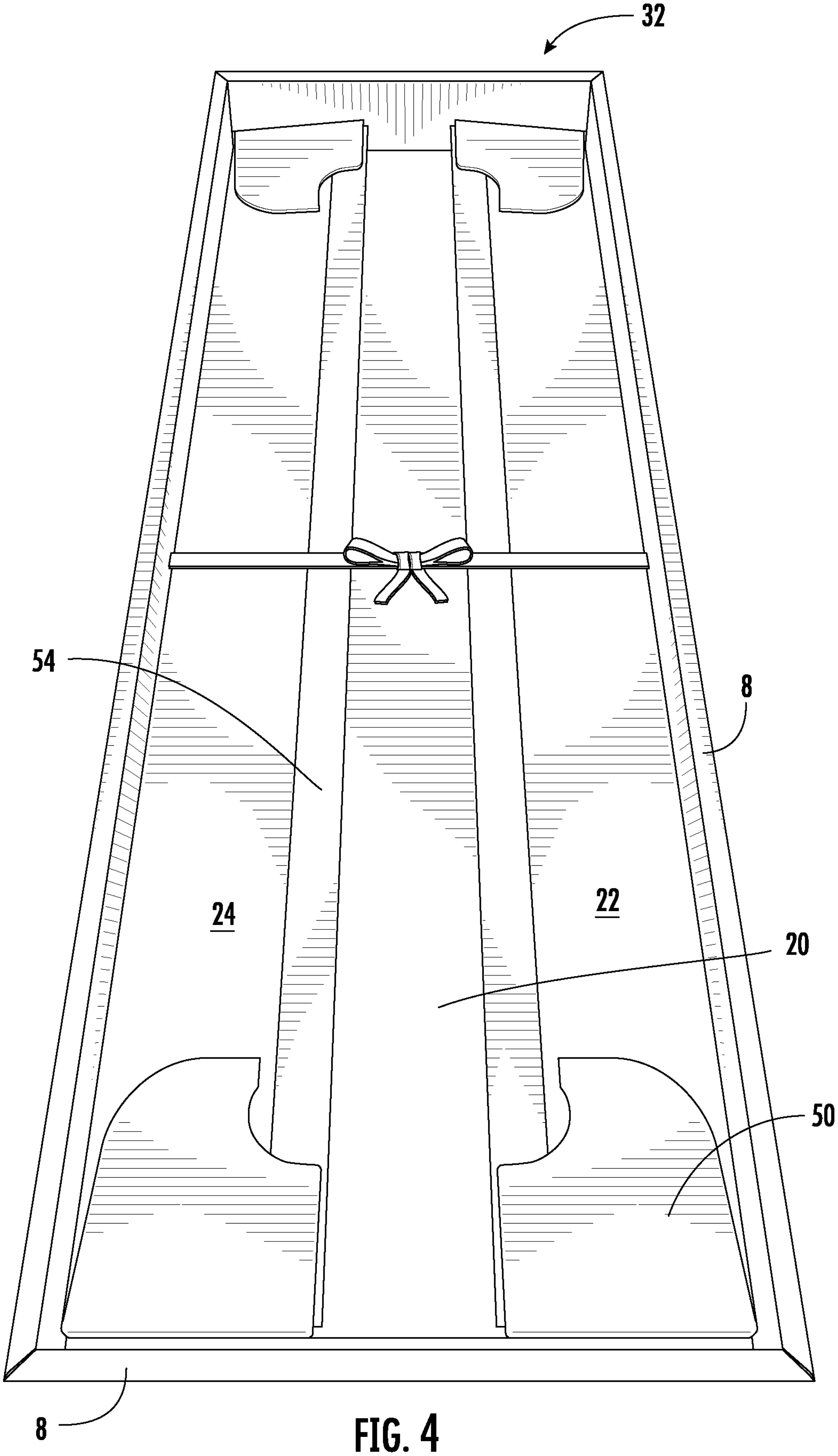
FIG. 4 shows a top perspective view of the lid of FIG. 2 in a collapsed shipment configuration.
Figure 5:
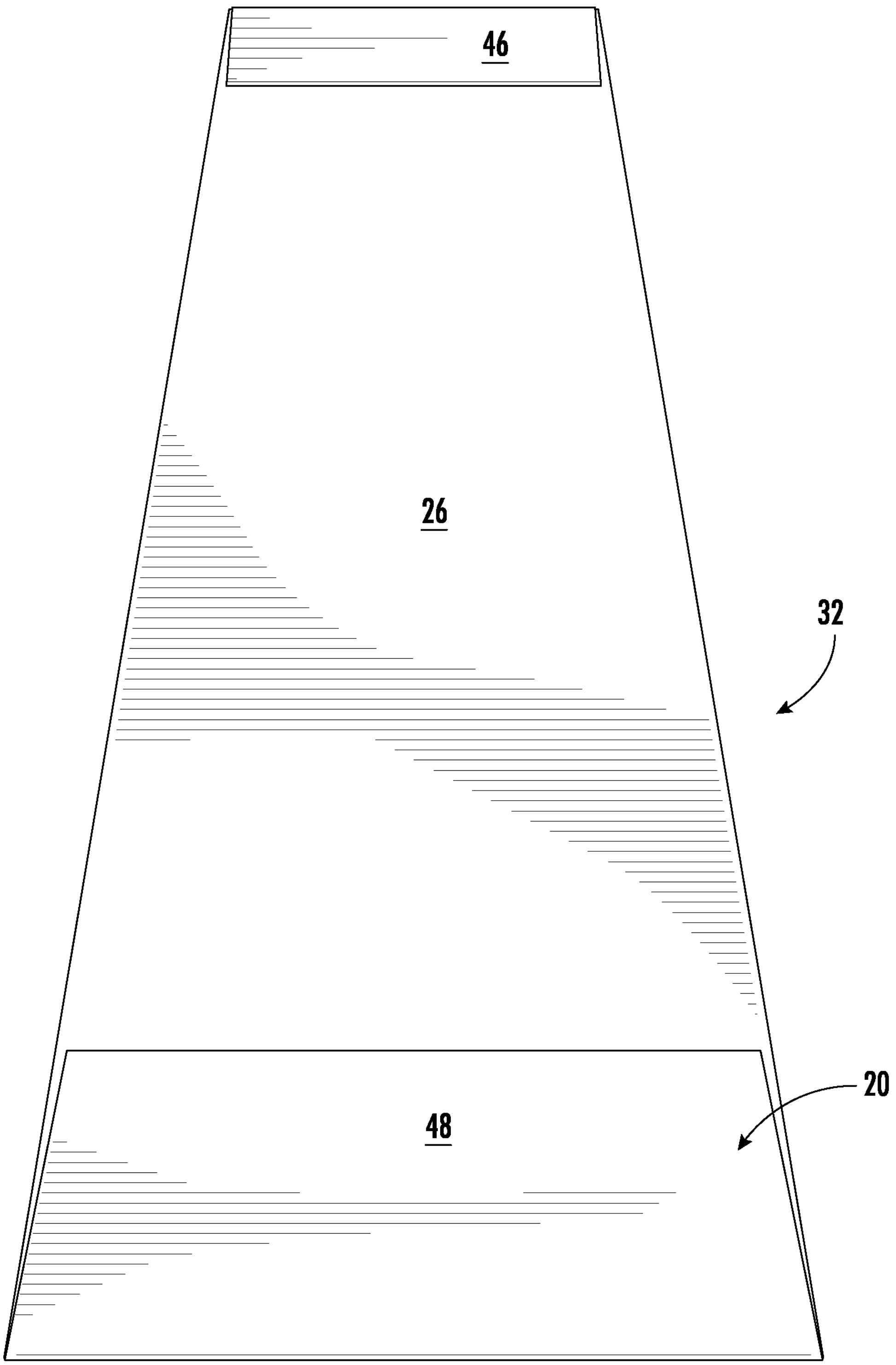
FIG. 5 shows a top perspective view of the lid of FIG. 2 in the collapsed shipment configuration.

FIG. 2 shows the funerary tray lid 10 of FIG. 1 inverted to provide a bottom perspective view. FIG. 3 shows a perspective view of an unfolded apparatus 10A which includes the structures of the lid 10 in an unfolded state. The unfolded apparatus 10A may be folded into the first folded configuration, which is for use as a casket lid as shown in FIGS. 1 and 2, and into a second folded configuration, which is collapsed for shipment within the casket tray 8. FIGS. 4 and 5 show the lid 10 in the second folded configuration, and are discussed further below. FIG. 4 shows a top perspective view of the lid 10 (or apparatus 10A) in the second folded configuration placed within the interior of the casket tray 8, and FIG. 5 shows a bottom perspective view of the lid 10 (or apparatus 10A) in the second folded configuration.

With reference to FIGS. 1 and 2, the lid 10 has a top wall 16, opposing side walls 12, 13 and opposing end walls 14, 15 that cooperate to form an enclosure having an interior 17. In this embodiment, the side panels 12, 13, end panels 14, 15 extend in the same downward direction from the top panel 16 to define an interior 17. The interior 17 cooperates with an interior of the tray 8 of FIG. 1 to form a container suitable for receiving an adult human body. It will be appreciated that in some embodiments, either or both of the end panels 14, 15 may take other forms, and/or may be eliminated. In this embodiment, however, the foldably connected end panels 14, 15 help improve the stability of the lid 10.

The lid 10 is formed by a folded corrugated fiberboard structure or skin 20, first and second side planks 22, 24, and a top plank 26. The details of the fiberboard skin are discussed below in connection with FIG. 6.

Figure 6:
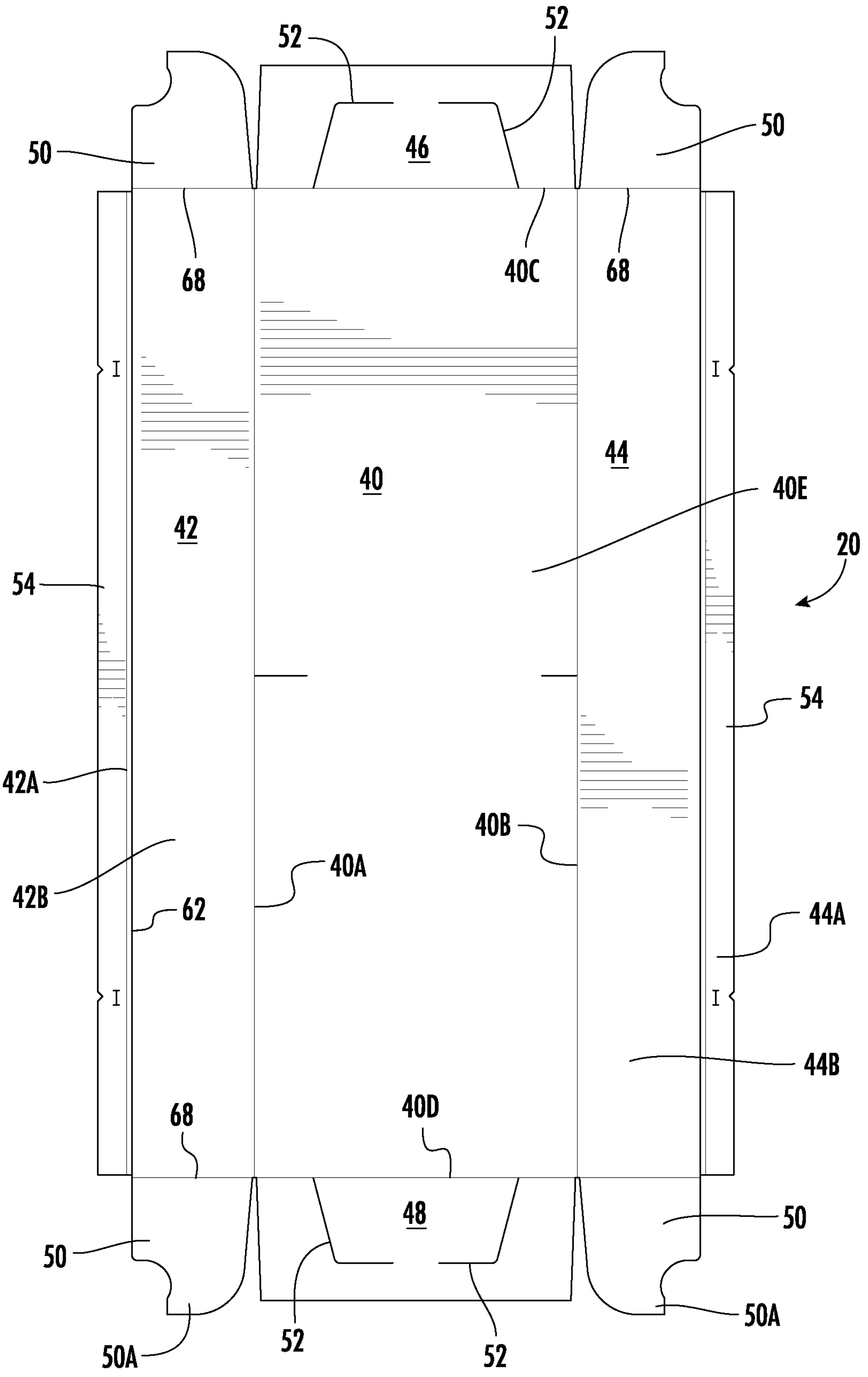
FIG. 6 shows a top plan view of the corrugated skin of the lid of FIG. 2.

In particular, FIG. 6 shows a top plan view of the corrugated structure or skin 20 apart from the planks 22, 24 and 26. The folded corrugated structure 20 has a rectangular top panel 40, a first side panel 42, a second side panel 44, a first end panel 46 and a second end panel 48. In this embodiment, the folded corrugated structure is formed by die-cutting and creasing a corrugated fiberboard blank. The rectangular first side panel 42 is foldably attached to, and extends substantially the length of, a first long edge 40A the top panel 40. Similarly, the second side panel 44 is foldably attached to, and extends substantially the length of, a second long edge 40B of the top panel 40. The first end panel 46 is foldably attached to, and extends substantially the length of a first short edge 40C of the top panel 40. The second end panel 48 foldably attached to and extends substantially the length of a second short edge 40D of the top panel 40.

Connection flaps 50 are foldably coupled to each end of the side panels 42, 44, and are configured to be received by and engaged with corresponding slots 52 formed in the end panels 46, 48. To this end, each connection flap includes a hooked end portion 50A that extends into a respective one of the four hockey-stick shaped slots 52 in the end panels 46, 48. The side panels 42, 44 also include wrap flaps 54. Each wrap flap 54 extends along the respective long edge 42A, 44A of the respective side panel 42, 44 that runs opposite the respective edge 40A, 40B that foldably connects to the top panel 40. The wrap flaps 54 are configured to extend around the long edges of the side planks 22, 24, as shown in FIGS. 2 and 3 and discussed below. FIG. 3 illustrates how the wrap flaps 54 extend in the flat state beyond the long edges of the side planks 22, 24, and thus can be folded to wrap around the such edges, as shown in FIG. 2.

With general reference to FIGS. 2 and 3, the top plank 26 is affixed to the top panel 40 to form the top wall 16. The top plank 26 extends a majority of the length and width of the top panel 40 to provide reinforcement thereto. Similarly, the first side plank 22 is affixed to the first side panel 42 to form the first side wall 12. The first side plank 22 extends a majority of a length of the first side panel 42. Likewise, the second side plank 24 is affixed to the second side panel 44 to form the second side wall 13. The second side plank 24 also extends a majority of a length of the second side panel 44.

The planks 22, 24 and 26 are formed of one or more solid materials having a rigidity greater than that of the corrugated structure 20. For example, each of the top plank 26, first side plank 22 and second side plank 24 may suitable be formed of the one or more solid materials such as lumber, particle board, oriented strand board, medium density fiberboard, plywood, chipboard and hardboard. In this disclosure, the use of the term "wood" means not only lumber, but also wood or wood-like products including particle board, oriented strand board, medium density fiberboard, plywoods, chipboard and hardboard (formed of many paper layers pressed together with an adhesive to have a hardness comparable to other wood products). The planks 22, 24 and 26 may be affixed to the respective panels 42, 44, and 40, for example, by adhesive.

As with the lid 10 itself, the folded corrugated structure 20 has a corresponding first folded configuration as shown in FIGS. 1 and 2 for use of the apparatus 10A as a lid, and a second folded configuration collapsed for shipment as shown in FIGS. 4 and 5. With reference to FIGS. 1, 3, and 6, the top plank 26 is disposed on a first surface 40E of the top panel 40 that faces the interior 17. The opposing second surface 40F of the top panel 40 forms the outer top surface of the lid 10, as shown in FIG. 1. Similarly, the first side plank 22 is disposed on a first surface 42B of the first side panel 42 that faces the interior 17 in the first folded configuration, and the second side plank 24 is disposed on a first surface 44B of the second side panel 44 that faces the interior 17 in the first folded configuration. The first side panel 42 has a second surface opposite the first surface 42B, not visible, and the second side panel 44 has a second surface 44C opposite the first surface 44B, as is visible in FIG. 1.

In the second folded configuration (see FIGS. 4 and 5), the first side panel 42 (with attached plank 22) is folded back such that the second surface of the first side panel 42 extends along and faces the second surface 40F of the top panel 40. Similarly, in the second folded configuration, the second side panel 44 (with attached plank 24) is folded back such that the second surface 44C extends along a faces the second surface 40F of the top panel 40. In this configuration, the apparatus 10A in this embodiment has a substantially reduced height and can fit within the tray 8 for shipment and storage, if desired. However, it will be appreciated that the reduced height second folded configuration of the lid apparatus 10A also provides shipping saving and storage convenience even if not shipped within a funerary tray.

As discussed above, in the first folded configuration, the lid 10 includes two opposing side walls 12, 13, two opposing end walls 14, 15, and a top wall 16 configured to form an inverted open top box that fits on (and into) the tray 8. In one embodiment, a series of clips 18 are used to couple the bottom of the side walls 12 to the top of the tray walls 8A. In this case, the bottom, not shown, of the side walls 12, 13

(and end walls 14, 15) fit within, and slight down into, the interior formed by the tray 8.

In an alternative embodiment, features attached to the interior of the walls 8A of the tray 8, or features attached to the exterior of the walls 12, 13 (and/or 14, 15) can be used to limit the vertical extent to which the lid 10 inserts into the tray 8 in the first folded configuration.

The planks 22, 24 and 26 provide structural strength for the lid 10, while the skin 20 binds the planks 22, 24, 26, provides ends 14, 15, and provides a uniform exterior surface. To this end, as shown in FIG. 3, the planks 22, 24 and 26 are arranged such that there is a gap 34 between the side plank 22 and the top plank 26, and a parallel gap 36 between the side plank 22 and the top plank 26. The gaps 34, 36 allows the side planks 22, 24, respectively, to fold inward into the first folded configuration as shown in FIG. 2. The gap width is a function of the thickness of the top plank 26. In general, the gap width is usually equal to the thickness of the top plank 26 plus a constant factor to allow for the corrugated fiberboard to bend around the outside to the second folded configuration. The constant value may suitably be somewhere between ⅛" and 1".

Figure 7A:
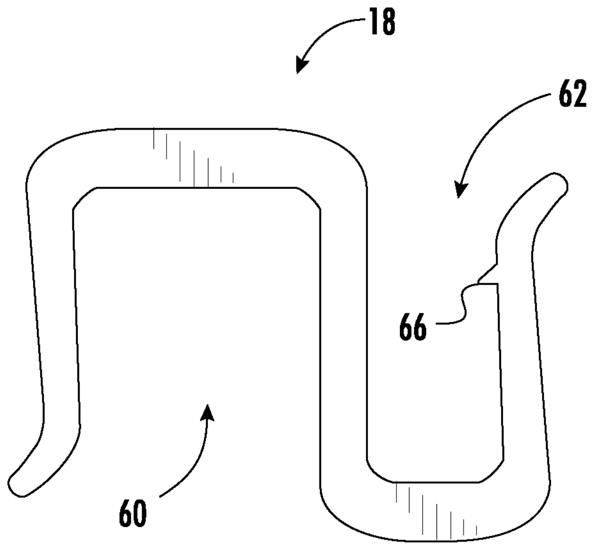
FIG. 7A shows a side plan view of a clip used on the funerary tray lid and tray of FIG. 1.
Figure 7B:
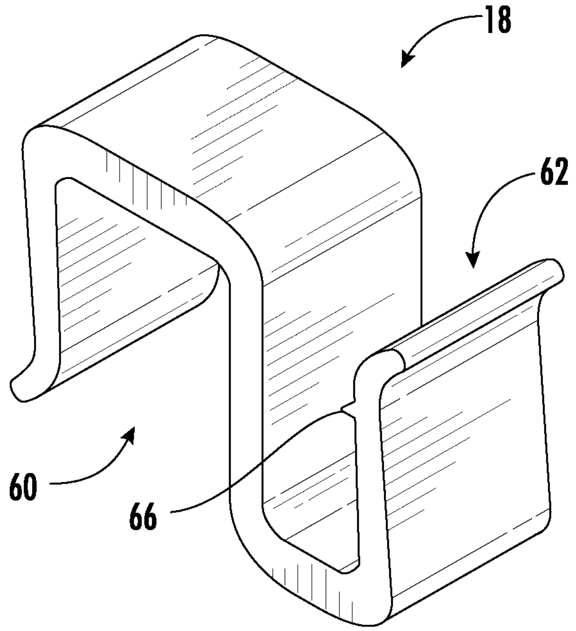
FIG. 7B shows a perspective view of the clip of FIG. 7A.

FIGS. 7A and 7B show an exemplary embodiment one of the clips 18 of FIG. 1. The clip has a general S-shape forming a first concave receiver 60, and a second, oppositely facing, concave receiver 62. The first receiver 60 is configured to fit over the top 8*a* of the side wall of the tray 8, and the second receiver 62 is configured to receive the bottom edge of the side walls 12 of the lid 10. The second receiver 62 includes a barb 66 that helps engage and retain corrugated fiberboard of the wrap flap 54 of the lid 10. In some cases, the wrap flap 54 may have a cutout, a slit, or other feature to both visually indicate where the clip 18 should be placed, and to engage the barb 66 positively. In other embodiments, the wrap flap 54 may include only visible indicia showing the proper location of the clip 18.

To construct the lid 10, a suitable corrugated fiberboard blank is die-cut to the shape of the skin 20 shown in FIG. 6. The die-cut also creates the slots 52 as shown. The various fold lines discussed above may be pre-stressed or pre-creased to facilitate later folding, using known techniques, and in some cases slit scored. The planks 22, 24, and 26 are then placed on the skin 20 as generally shown in FIG. 3, and attached in place, for example, by hot-melt or other adhesive. In general, the planks extend the length of the lid 10 in a parallel manner. The plank 22 is separated along its length from the plank 26 by the gap 34, and the plank 24 is separated along its length from the plank 26 by the gap 36.

The wrap flaps 54 are then wrapped around the outer edges of the side planks 22, and 24. It will be appreciated that FIG. 3 shows the unfolded lid 30 with this step already completed. The unfolded lid 30 may then be converted to the second folded configuration 32 as shown in FIGS. 4 and 5.

To place the unfolded lid apparatus 10A into the second folded configuration 32, the side panel 42 and plank 22 are folded 180 degrees under the top panel 40 of the skin 20, and the side panel 44 and plank 24 are similarly folded 180 degrees under the top panel 40. Each connection flap 50 is folded back over the end of one of the planks 22, and 24 that is attached to the respective side panel 42, 44 to which the connection flap 50 is foldably connected. The result is shown in FIG. 4. In addition, the end panels 46, 48 are folded 180 degrees over the top plank 26, as shown in FIG. 5. The second folded configuration 32 may be secured in the folded position as shown in FIGS. 4 and 5 by wrapping tape, straps or other material that can be easily removed for use after shipping.

The apparatus 10A in the second folded configuration 32 may then be placed in the tray 8 for shipment of the entire (but only partially constructed) casket arrangement 5 as shown in FIG. 4. It will be noted that with the collapsed lid (second folded configuration) 32 disposed within the constructed tray 8, the vertical footprint for shipment is greatly reduced compared to the first folded configuration (lid 10) shown in FIG. 1. Accordingly, a method disclosed herein includes preparing the collapsed lid 32 shown in FIGS. 4 and 5 and discussed above, which is configurable by folding into the lid 10 shown in FIGS. 1 and 2. Another method includes shipping the collapsed lid 32 and tray 8 in the configuration shown in FIG. 4. It will be appreciated that the lid may be shipped in other containers, including full height containers, or casket containers with multiple configurations, such as that shown in U.S. Pat. No. 8,104,151. It will be appreciated that the shipment method preferably includes placing a plurality of the clips 18 into the interior of the tray 8.

Another method disclosed herein is constructing the lid 10 from the second folded configuration 32. First, the collapsed lid 32 is removed from the tray 8. Then, the straps and tape are removed. The connection flaps 50 are unfolded, and then the side panels 42, 44 and their respective planks 22, 24 are unfolded. The partially unfolded collapsed lid may then be flipped over, and the end panels 46, 48 unfolded. The result resembles the unfolded apparatus 10A of FIG. 3 again, with the understanding that the flaps 50 and end panels 46, 48 need not necessarily lay out completely flat.

Thereafter, the side panels 42, 44 and their respective planks 22, 24 are folded 90 degrees upward, and the end panels 46, 48 are folded 90 degrees upward to form a container. The connection flaps 50 are inserted into the slots 52 and engage the end panels 46, 48 to secure the lid 10 in the configuration shown in FIG. 2. In that configuration, the user may place the second receiver 62 of each clip 18 over the edge of the side panels 42, 44 (and/or end panels 46, 48) using the visual guide, not shown, on the side panels 42, 44. As discussed above, the guide may be a cutout or printed indicia that indicates the intended location of the clips 18. If a cutout is used, then it can also be configured to directly engage the barb 66 to secure the lid to the lid 10.

The lid 10 can then be placed on the tray by placing the first receivers 60 of the clips 18 on the lid 10 over the top edges 8*a* of the tray 8.

Figure 13:
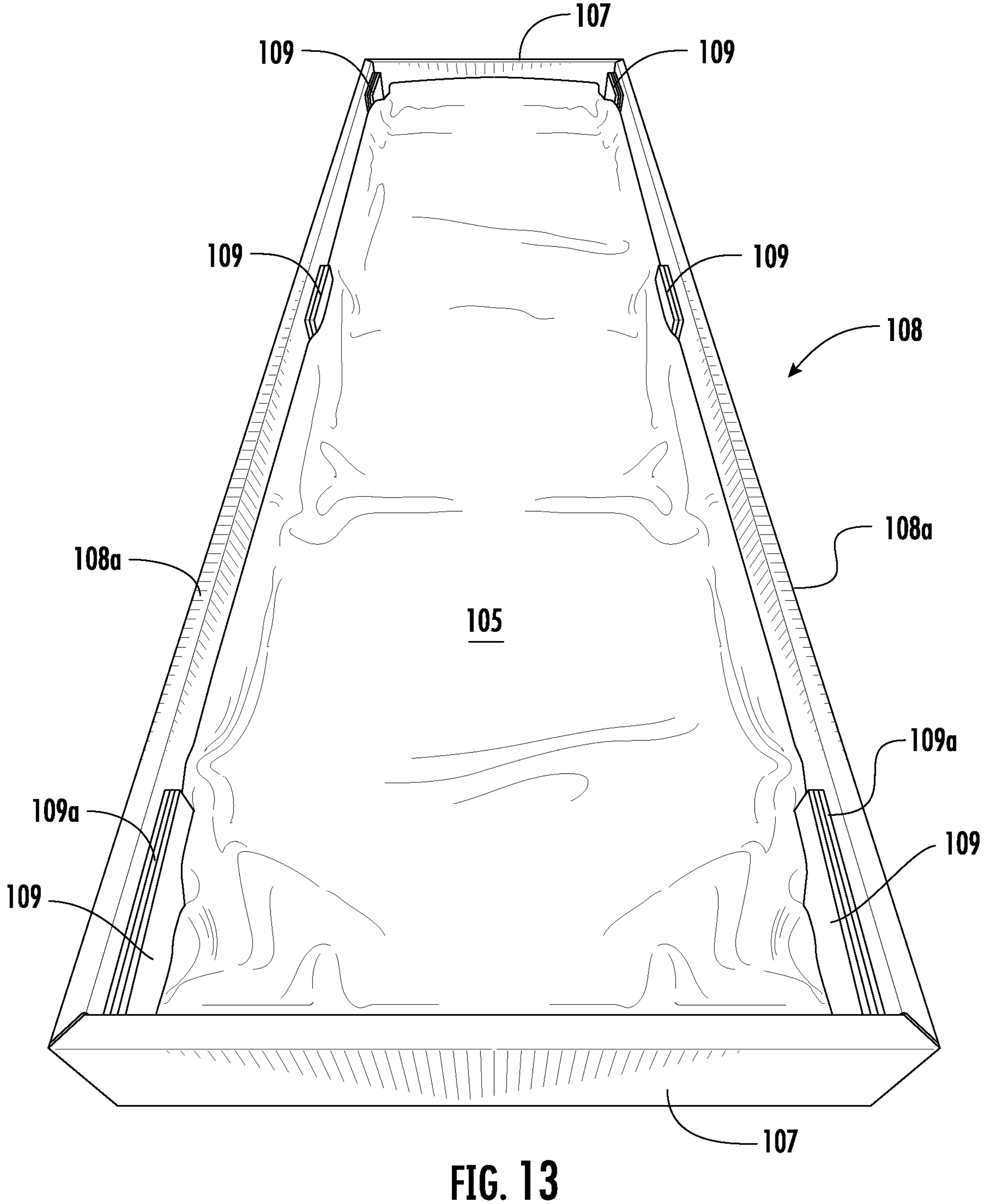
FIG. 13 shows a perspective view of an alternative embodiment of a tray for use with the lid.

The lid 10 can also be used with an alternative embodiment of the tray 108 shown in FIG. 13. In particular, FIG. 13 shows a perspective view of an alternative embodiment of a tray for use with the lid 10. The tray 108 in FIG. 13 also has included in its interior an insert 105 covered in fabric. The tray 108 has sides 108*a* and ends 107 that may constructed in any suitable manner, such as those discussed further above. However, the tray 108 in this embodiment includes a plurality of blocks 109 affixed to the inside surfaces of the side 108*a*, and which are configured to receive and support that lid 10 thereon.

In particular, the blocks 109, which may suitably be formed of corrugated fiberboard that is attached to the inside surfaces of the opposing sides 108*a*, has a top surface 109*a* that is recessed approximately 1.25 to 5 centimeters below the top edge of the sides 108*a*. When the lid 10 is placed on the tray 108, the bottom edges of the sides 12, 13 of the lid engages and rests upon the top surface 109*a* of the blocks 109. If a tray 108 with the blocks 109 are used then the clips 18 of FIGS. 7A and 7B would not be necessary.

Figure 8:
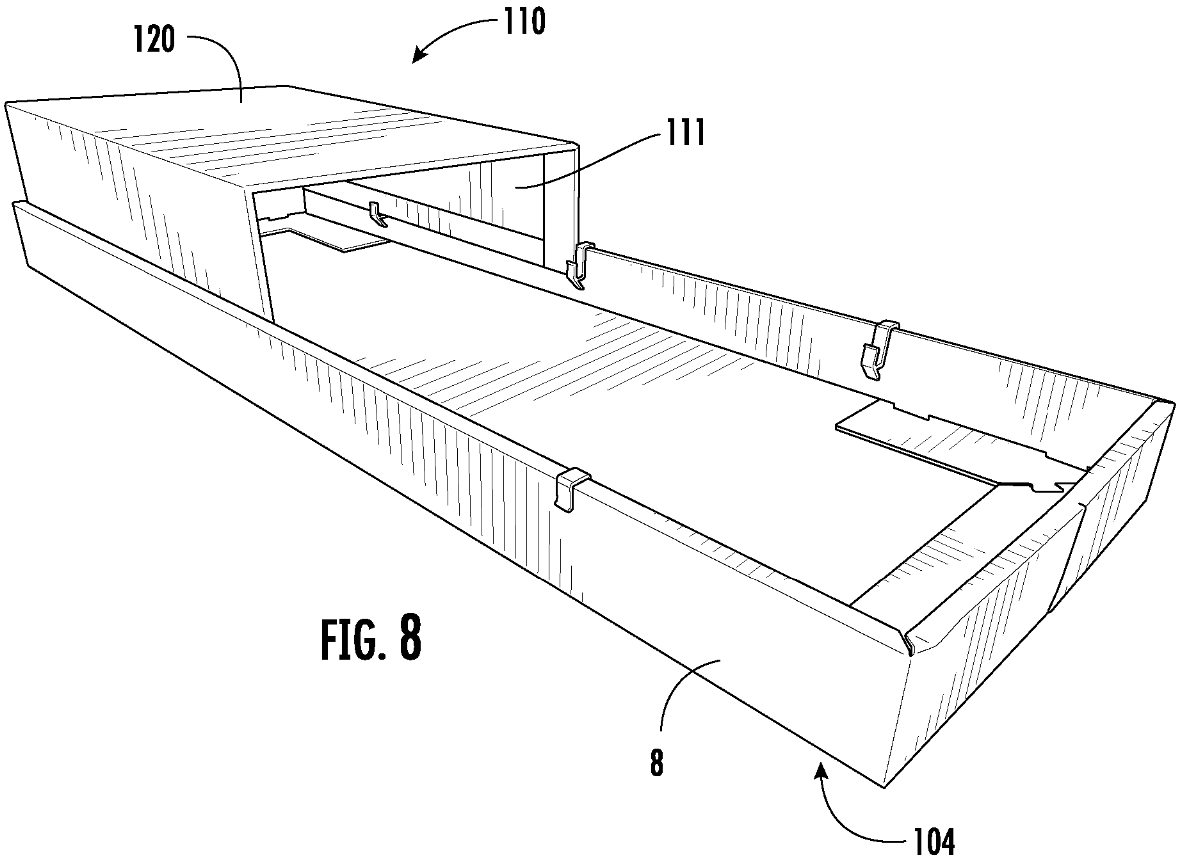
FIG. 8 shows a perspective view of an alternative embodiment of the funerary tray lid disposed on a funeral tray.

In an alternative embodiment, a casket arrangement 104 has the tray 8 and two lids 110, each covering approximately half of the interior of the tray 8. FIG. 8 shows a perspective view of the casket arrangement 104 with one of the two lids 110 installed on the tray 8. Such arrangements can be used for funeral services where only the upper torso and head of the deceased are displayed. A modesty skirt, not shown, may be attached to the underside of the lid 110 to limit the visibility of the lower torso and legs if desired.

Figure 9:
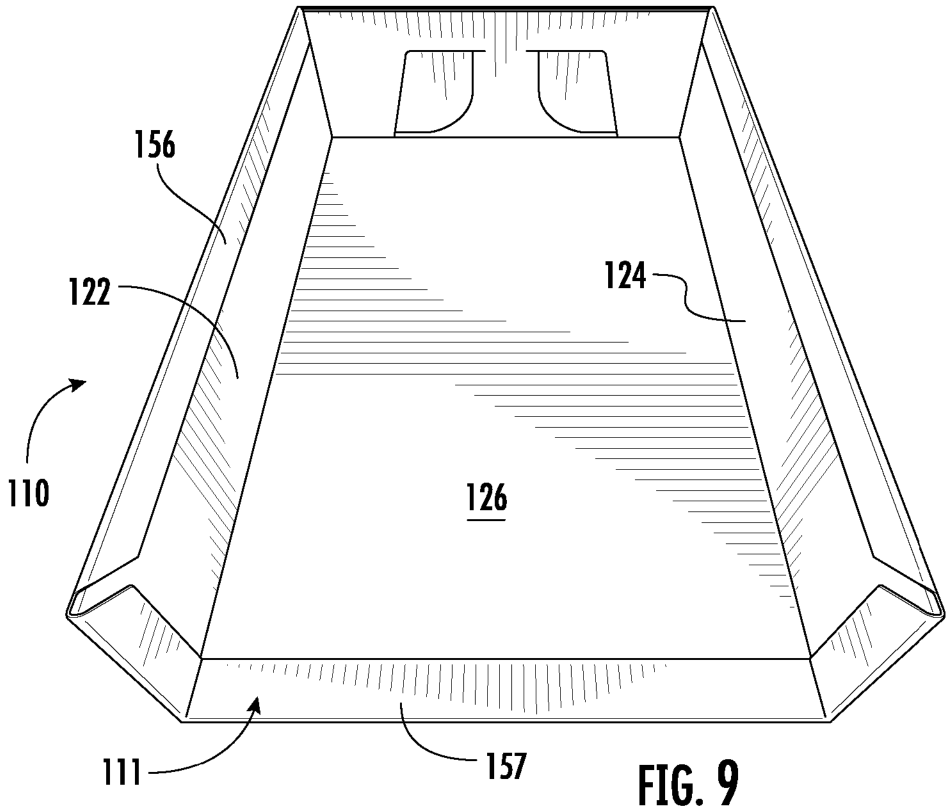
FIG. 9 shows a bottom perspective view of the funeral tray lid of FIG. 8.

The lid 110 includes many of the features of the lid 10 discussed above. FIG. 9 shows a bottom view of the half-lid 110 removed from the tray 8. The lid 110 is formed as an open top container similar to the lid 10, but with an open interior end 111. The lid 110 includes three planks 122, 124, 126 which are half the length of, but otherwise substantially identical to, respectively, the planks 22, 24 and 26. The planks 122, 124, 126 are disposed on a corrugated fiberboard skin 120 that is likewise substantially similar to the skin 20, but cut in half. The corrugated fiber skin 120 differs from being exactly one-half of the skin 20 by including additional wrap flaps 157 that wrap around the interior edges of the planks 122, 124 and 126 that are disposed at the open end 111, as shown in FIG. 9. FIGS. 8 and 9 show the lid 110 in the first folded configuration for use on the tray 8 to display and/or otherwise contain a deceased.

Figure 10:
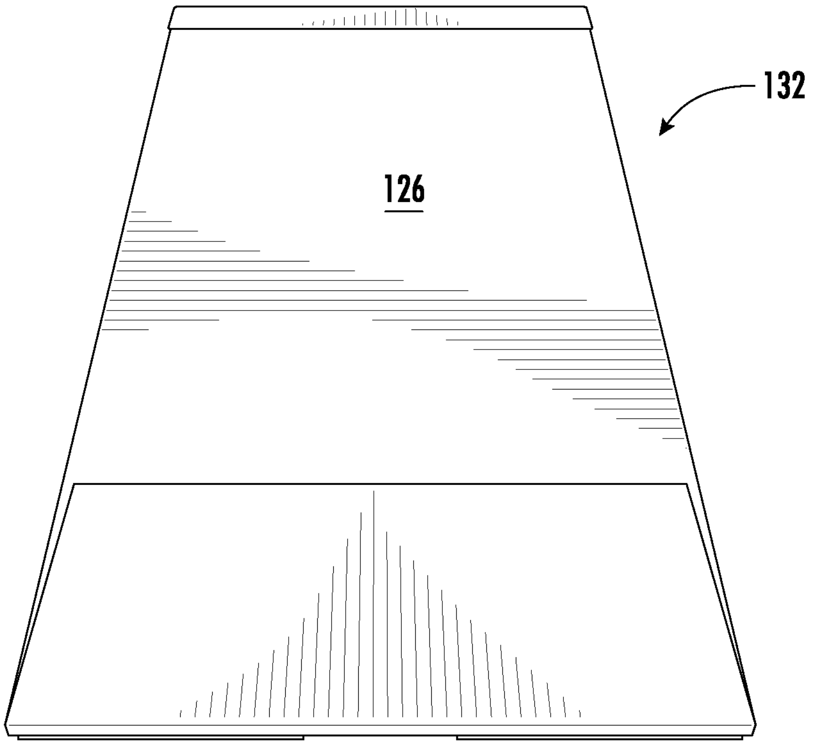
FIG. 10 shows a bottom perspective view of the lid of FIG. 9 in a collapsed shipment configuration.
Figure 11:
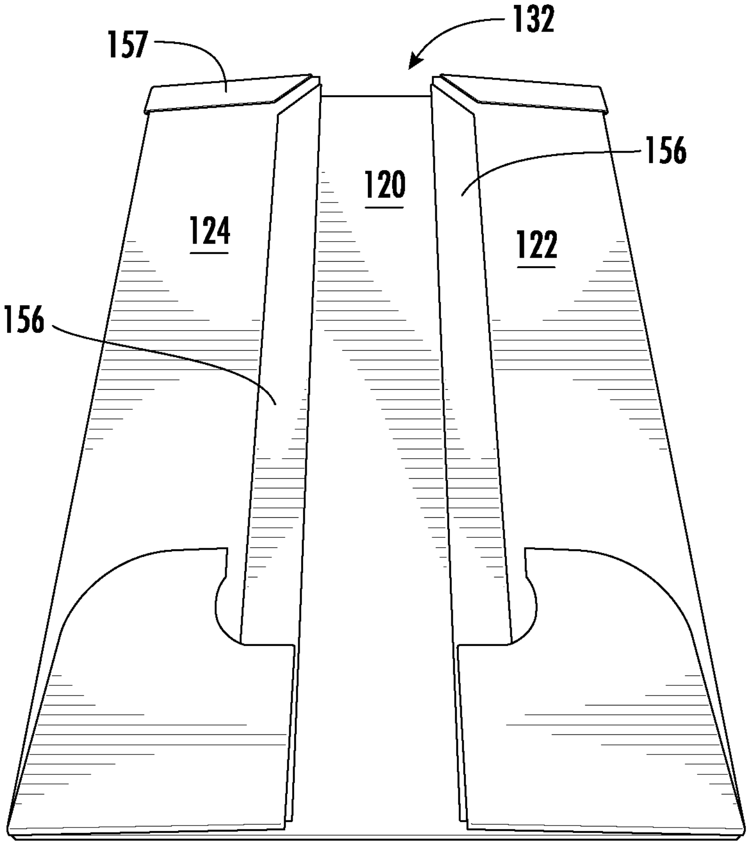
FIG. 11 shows a top perspective view of the lid of FIG. 9 in the collapsed shipment configuration.
Figure 12:
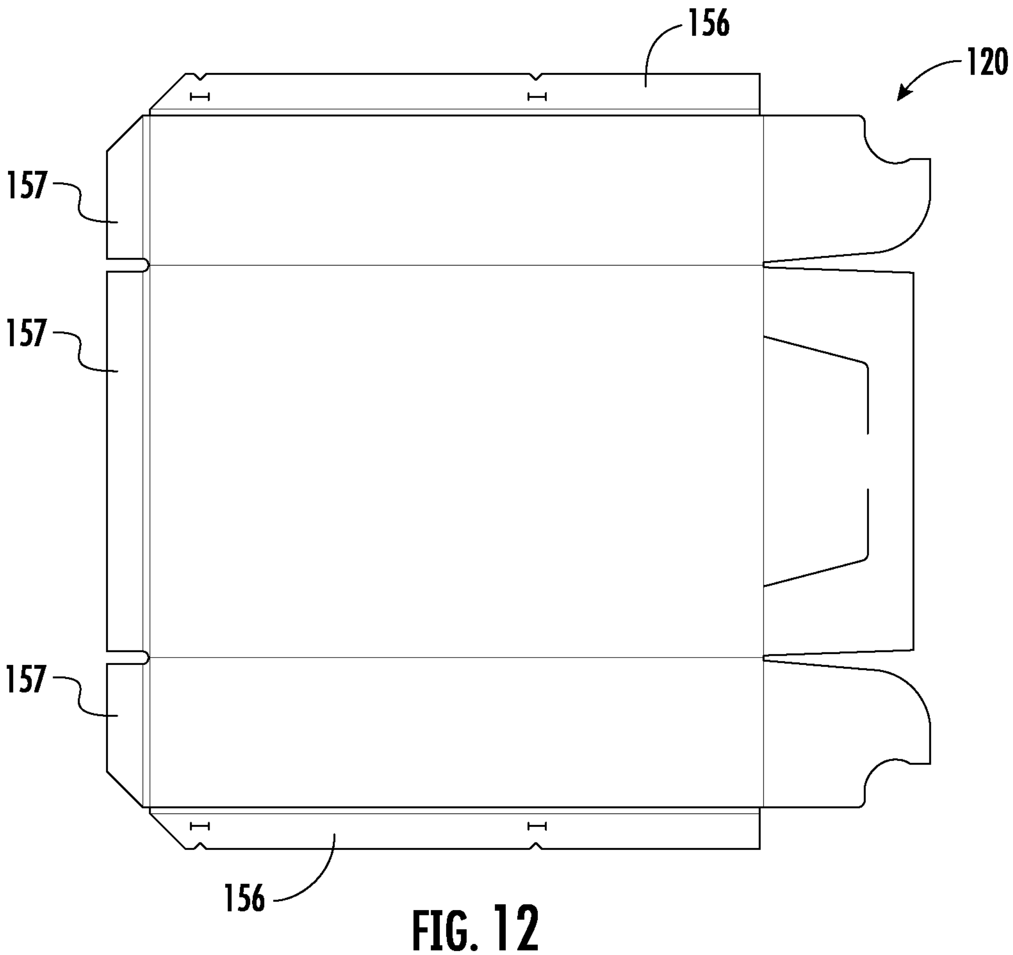
FIG. 12 shows a top plan view of the corrugated fiberboard skin of the funeral tray lid of FIG. 9.

FIGS. 10 and 11 show top and bottom views of the lid 110 collapsed into a second folded configuration. Two of the lids 110 in the second folded (or shipping) configuration, may be shipped in a tray 8 for use therewith. FIG. 12 shows the skin 120 in blank form, with the plank 122, 124 and 126 removed. The method of constructing the lid apparatus into the second folded (shipping) configuration, and constructing lid 110 from the second folded configuration to the first folded configuration (FIG. 8), is the same as that described above in connection with FIGS. 1-7B. It will be appreciated that the additional structure of the wrap flaps 157 are folded over and attached when the wrap flaps 156 (or flaps 56) are attached.

It will be appreciated that the above-described embodiments are merely exemplary and that those of ordinary skill in the art may readily devise their own implementations and embodiments that incorporate the principals of the present invention and fall within the spirit and scope thereof. It will further be appreciated that in some embodiments the materials of the skin 20, 120 and planks 22, 24, 26, 122, 124 and 126 may differ, but the plank material should be a substrate have a greater stiffness and hardness than the skin.

The invention claimed is:

1. A lid for a casket, comprising:

a folded corrugated structure having a top panel having a length and width, a first side panel foldably attached to the top panel along a first long edge, a second side panel foldably attached to the top panel along a second long edge;

a top plank affixed to the top panel, the top plank extending a majority of the length and width of the top panel;

a first side plank affixed to the first side panel, and extending a majority of a length of the first side panel;

a second side plank affixed to the second side panel, and extending a majority of a length of the second side panel, wherein the top plank, the first side plank, and the second side plank are formed of one or more solid materials having a rigidity greater than that of the corrugated structure, such that the top plank has the rigidity greater than that of the corrugated structure along the majority of the length and width of the top panel.

2. The lid of claim 1, wherein the one or more solid materials are selected from at least one of a group consisting of lumber, particle board, oriented strand board, medium density fiberboard, plywood, chipboard and hardboard.

3. The lid of claim 1, wherein the folded corrugated structure defines an interior in a first folded configuration, and wherein:

the top plank is disposed on a first surface of the top panel, the first surface of the top panel facing the interior in the first folded configuration; and the first side plank is disposed on a first surface of the first side panel, the first surface of the first side panel facing the interior in the first folded configuration.

4. The lid of claim 3, wherein:

the first side panel has a second surface opposite the first surface of the first side panel;

the top panel has a second surface opposite the first surface of the top panel; and the folded corrugated structure has a second configuration where the first side panel is folded back such that the second surface of the first side panel extends along and against the second surface of the top panel.

5. The lid of claim 1, wherein the folded corrugated structure includes a first flap foldably attached to the first side panel, the first flap extending around a first edge of the first side plank.

6. The lid of claim 5, wherein the first flap extends substantially the length of the first side panel.

7. The lid of claim 1, further comprising a first end panel extending a first short edge of the top panel.

8. The lid of claim 7, wherein the first end panel is coupled to the first short edge of the top panel.

9. The lid of claim 8, wherein the first end panel is foldably attached to the first short edge of the top panel.

10. The lid of claim 1, wherein the lid has a first configuration wherein the first side plank and the second side plank have a first orientation with respect to the top plank, and a second configuration wherein the first side plank and the second side plank have a second orientation with respect to the top plank.

11. The lid of claim 10, wherein:

the first side plank has a first surface that defines a first plane, and the top plank has an inner surface defining a second plane;

the first plane and the second plane are substantially perpendicular in the first configuration; and the first plane and the second plane are non-perpendicular in the second configuration.

12. The lid of claim 10, wherein the lid in the first configuration has a first height, and the lid in the second configuration has a second height that is less than the first height.

13. An apparatus configurable into a casket lid, comprising;

a corrugated structure having a top panel having a length and width, a first side panel foldably attached to the top panel along a first long edge, a second side panel foldably attached to the top panel along a second long edge;

a top plank affixed to the top panel, the top plank extending a majority of the length and width of the top panel;

a first side plank affixed to the first side panel, and extending a majority of a length of the first side panel, wherein a first lengthwise gap extends between the first side plank and the top plank, and wherein a first fold line in the corrugated structure between the top panel and the first side panel is aligned with the first lengthwise gap;

a second side plank affixed to the second side panel, and extending a majority of a length of the second side panel, wherein a second lengthwise gap extends between the second side plank and the top plank, and wherein a second fold line in the corrugated structure between the top panel and the second side panel is aligned with the second lengthwise gap; and wherein the top plank, the first side plank, and the second side plank are formed of one or more solid materials having a rigidity greater than that of the corrugated structure.

14. The apparatus of claim 13, wherein the first lengthwise gap is configured to allow the first side panel to fold at least approximately ninety degrees in either direction with respect to the top panel with the first side plank affixed to the first side panel, and with the top plank affixed to the top panel.

15. The apparatus of claim 14, wherein the first lengthwise gap is configured to allow the first side panel to fold approximately one hundred eighty degrees in a first direction with respect to the top panel with the first side plank affixed to the first side panel, and with the top plank affixed to the top panel.

16. The apparatus of claim 13, wherein the one or more solid materials are selected from at least one of a group consisting of lumber, particle board, oriented strand board, medium density fiberboard, plywood, chipboard and hardboard.

17. The apparatus of claim 13, wherein the first side panel, the second side panel, and top panel may be arranged in a first folded configuration adapted for covering at least a portion of a casket body interior, the casket body interior having a length and width adapted to receive an adult human body.

18. The apparatus of claim 17, wherein in the first folded configuration:

the top plank is disposed on a first surface of the top panel, the first surface of the top panel facing the casket body interior; and the first side plank is disposed on a first surface of the first side panel, the first surface of the first side panel facing the casket body interior.

19. The apparatus of claim 18, wherein:

wherein the first side panel, the second side panel, and the top panel may be arranged in a second folded configuration;

the first side panel has a second surface opposite the first surface of the first side panel;

the top panel has a second surface opposite the first surface of the top panel; and in the second folded configuration, the first side panel is folded back such that the second surface of the first side panel extends along and against the second surface of the top panel.

20. A lid for a casket, comprising:

a folded corrugated structure having a top panel having a length and width, a first side panel foldably attached to the top panel along a first long edge, a second side panel foldably attached to the top panel along a second long edge;

a top plank affixed to the top panel, the top plank extending a majority of the length and width of the top panel;

a first side plank affixed to the first side panel, and extending a majority of a length of the first side panel, wherein the first side panel and first side plank are configured to fold together about a fold line between the first side panel and the top panel;

a second side plank affixed to the second side panel, and extending a majority of a length of the second side panel, wherein the top plank, the first side plank, and the second side plank are formed of one or more solid materials having a rigidity greater than that of the corrugated structure.

* * * * *